United States Patent [19]

Palarino

[11] 4,020,873
[45] May 3, 1977

[54] THREAD PROTECTOR FOR AN EXTERNALLY THREADED PIPE

[75] Inventor: Ronald H. Palarino, North Huntington, Pa.

[73] Assignee: Precise Metals & Plastics, Inc., East McKeesport, Pa.

[22] Filed: July 18, 1975

[21] Appl. No.: 597,239

[52] U.S. Cl. .................................................. 138/96 T
[51] Int. Cl.² ................................................ B65D 59/06
[58] Field of Search ............ 138/96 T, 96 R, 89; 215/43 A

[56] References Cited

UNITED STATES PATENTS

| | | | |
|---|---|---|---|
| 1,820,140 | 8/1931 | Hunter | 138/96 T |
| 2,022,189 | 11/1935 | Engstrom | 138/96 T |
| 2,229,217 | 1/1941 | McCombs | 215/334 |
| 2,316,013 | 4/1943 | Mulholland | 138/96 T |
| 2,378,710 | 6/1945 | Keause | 138/96 T |
| 2,880,761 | 4/1959 | Peter | 138/96 T |
| 3,485,271 | 12/1969 | Halsey | 138/96 T |

FOREIGN PATENTS OR APPLICATIONS 629,900  1961  Canada .......................... 138/96 T

*Primary Examiner*—Richard E. Aegerter
*Assistant Examiner*—James E. Bryant, III
*Attorney, Agent, or Firm*—Parmelee, Miller, Welsh & Kratz

[57] ABSTRACT

A thread protector for the external threads of a pipe comprises two parts, an outer sleeve and an inner casing having spaced arcuate sections. The arcuate sections have threads thereon conforming to the pipe threads, a flange at their outer end having raised bosses around its inner periphery, and a shoulder around its other end. The outer sleeve is axially matable with the casing, having a lip at its outer end and a channel about its other end. The two parts are axially secured to the threaded pipe and locked thereon by interaction of the casing and sleeve so that the unit is removable from the threaded pipe only by unscrewing the same as a unit.

9 Claims, 5 Drawing Figures

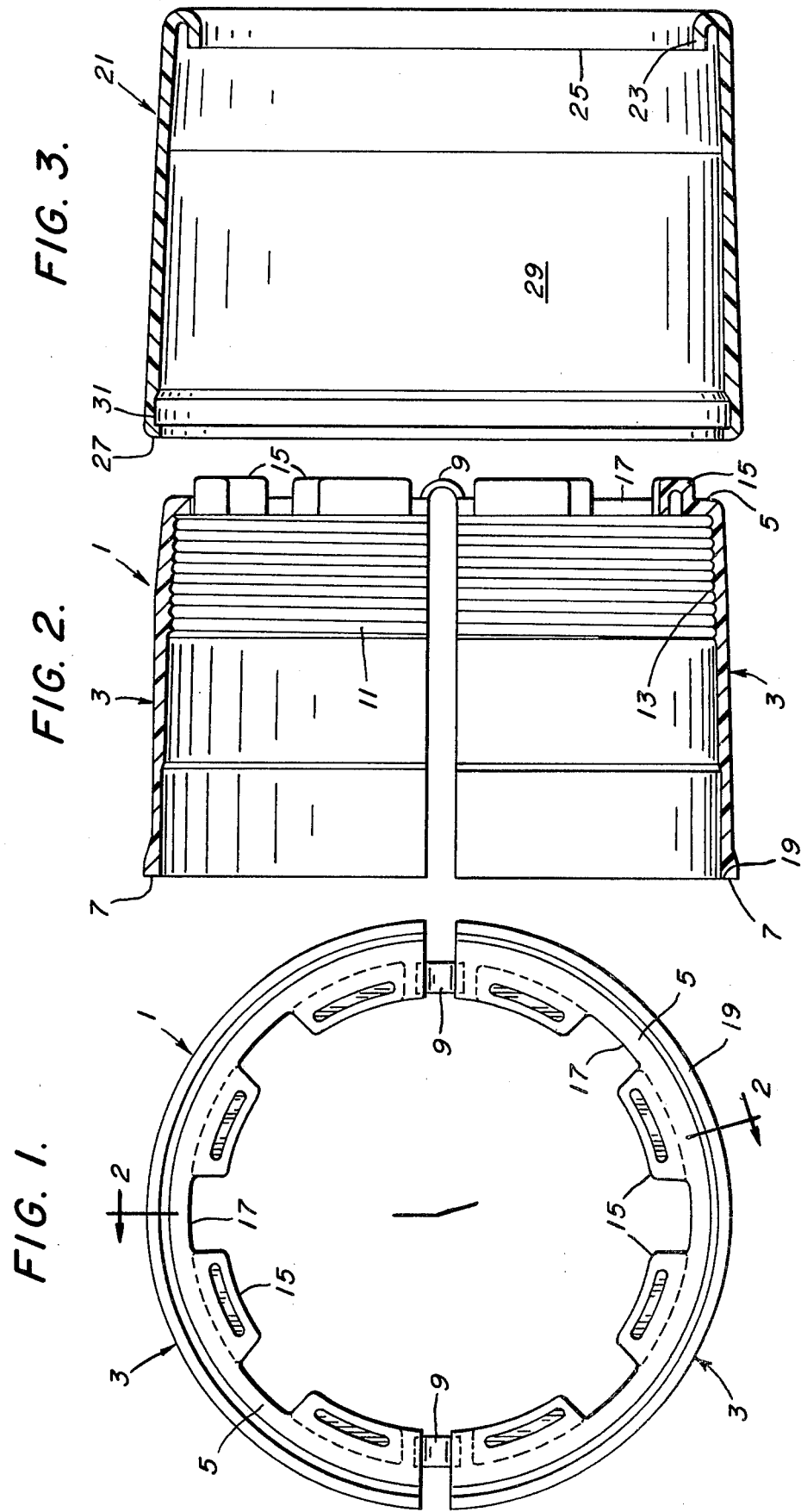

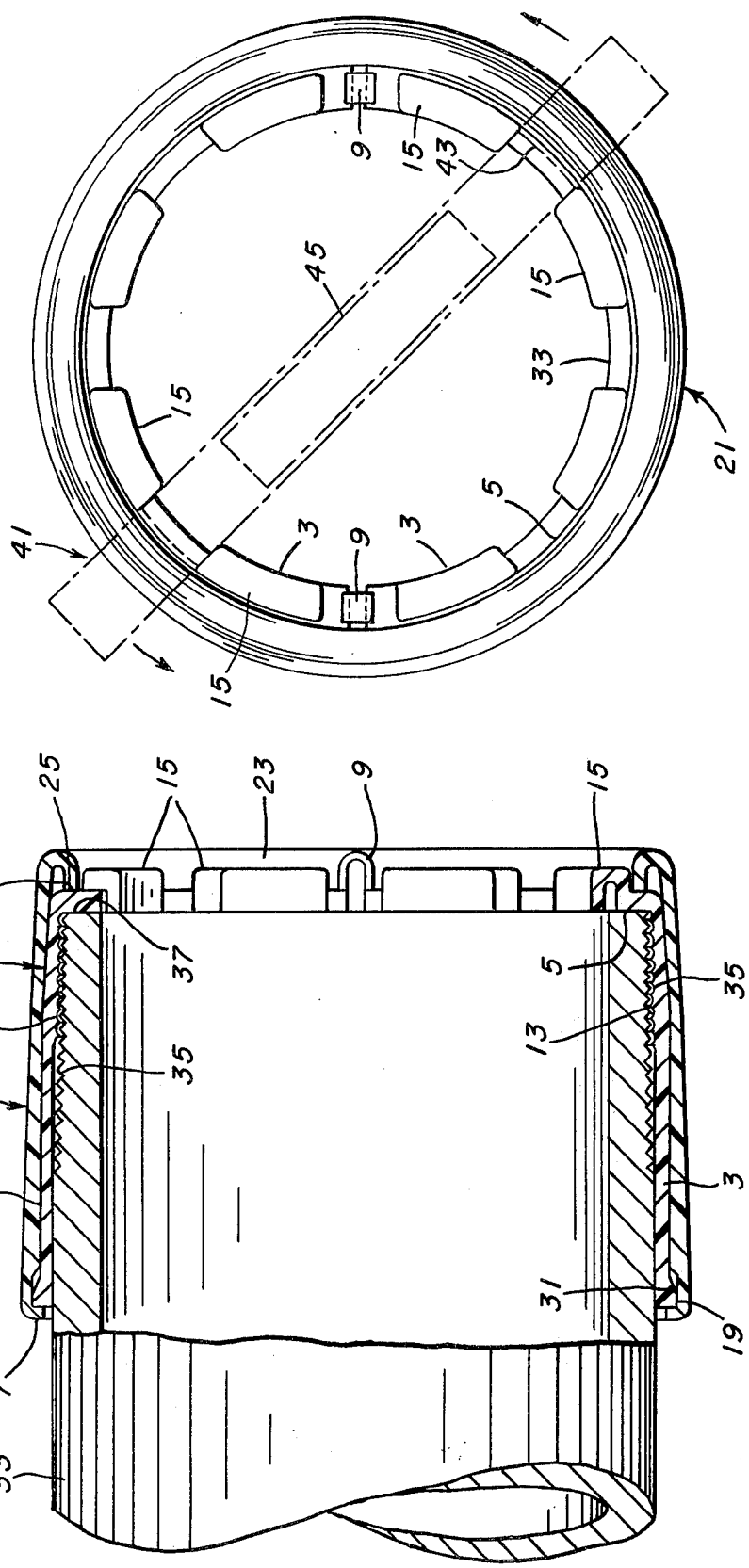

THREAD PROTECTOR FOR AN EXTERNALLY THREADED PIPE

BACKGROUND OF THE INVENTION

Followng the production and threading of pipe, such as pipe used in the transfer of natural gas and oil, the threads of the pipe, which are susceptible to damage from impact of shear forces, must be protected during transporting as well as storage. Damage to a thread on a pipe can result in the rejection of the entire pipe section and the attendant cost of replacement.

Numerous constructions have been proposed for protective means for pipe threads, some using metal, fibrous or plastic parts or combinations of such materials. Previous such constructions have generally suffered from the complexity of the protectors, the cost of fabrication of such protectors, and the cost of labor needed to assemble such protectors onto a threaded pipe. In addition, the danger of loosening or separation of the protector from the pipe is a serious problem, especially in view of the vibrations and varous impacts that pipes with protectors thereon are subjected to during loading, transporting, and unloading.

SUMMARY OF THE INVENTION

A thread protector for external threads on a pipe comprises an inner cylindrically shaped casing composed of spaced confronting arcuate sections and an outer cylindrically shaped sleeve matable over the casing after placement of the casing on the pipe such that the casing and sleeve are locked together as a unit and to the pipe whereby removal of the unit is achieved only by unscrewing the same from the threads of the pipe. The arcuate sections of the casing have threads thereon which mesh with the threads of the pipe and a flange at the outer end which extends towards the axis of the casing, the flange having raised bosses thereon around its inner periphery. A shoulder is provided on the outer surface of the arcuate sections adjacent the opposite end. The sleeve has an inwardly and axially depending lip at its outer end which is contiguous with the flange of the casing when the two are assembled and a channel around the inner surface thereof adjacent the other end that is matable with the shoulder of the flange of the casing so that the two parts, when assembled on a threaded pipe, are locked securely to the pipe and each other.

BRIEF DESCRIPTION OF THE DRAWINGS

FIG. 1 is an end view of the inner casing forming a part of the thread protector of the present invention;

FIG. 2 is a view taken along the lines 2—2 of FIG. 1;

FIG. 3 is a cross-sectional view of the outer sleeve forming a part of the thread protector of the present invention;

FIG. 4 is a cross-sectional view of the thread protector of the present invention in place upon the threaded end of a section of pipe; and FIG. 5 is an end view of the thread protector of the present invention showing the casing and sleeve assembled as a unit.

DETAILED DESCRIPTION

The thread protector of the present invention comprises a pair of matable parts, an inner casing and an outer sleeve constructed so as to lock with each other and with a threaded pipe to which they are affixed, so that the removal of the protector as a unit is effected only by unscrewing the same therefrom.

Referring now to the drawings and specifically to FIGS. 1 and 2, there is illustrated an inner cylindrically shaped casing 1, which is composed of two spaced, confronting arcuate sections 3, having a flange 5 at one end thereof, the flange 5 extending towards the axis of the casing. The arcuate sections are flared slightly outwardly from the outer end having the flange 5 towards the inner end 7 thereof. The arcuate sections 3 are interconnected to each other by webs or connecting strips 9, which webs are shown connecting the sections 3 together through the flange 5. Threads 11 are provided on the inner surface of the arcuate sections 3, which threads are designed to mesh with the threads of the pipe that is to be protected. Preferably, the threads are sharply pointed at the ridges 13 thereof so as to prevent superimposition of those ridges on any of the ridges of the pipe thread.

Provided on the flanges 5 of the arcuate sections 3 are raised bosses 15, which are axially extending, the bosses 15 positioned around the inner periphery 17 of the flanges 5. The bosses 15 are spaced equidistantly about the inner periphery of the flange 5, with the eight such bosses shown being the preferred number although the number may vary. Adjacent the other end of the arcuate sections 3 opposite the flanged or outer end, there is provided a shoulder 19, which shoulder is raised about the outer surface of the arcuate sections 3.

The outer cylindrically shaped unitary sleeve 21, which is matable with the inner casing 1, is illustrated in cross-section in FIG. 3. As shown, the sleeve 21 has an inner and axially depending lip 23 about one end thereof, the lip terminating as a flat ridge 25. At the opposite and inner end 27 there is, along the inner surface 29 and adjacent the end 27, a channel 31, which channel is so designed as to conform to the shoulder 19 on the outer surface of the arcuate sections 3 of the casing 1.

The inner casing 1 and outer sleeve 21, as shown in FIGS. 2 and 3, illustrate the two parts in position for placement upon a threaded pipe. The casing, because of is interconnected arcuate sections can be spread apart at the ends 7 which permits easy axial placement of the casing upon the threaded end of a pipe without need for careful alignment. Upon placement of the casing 1 upon the threaded end of the pipe, with the flange 5 flush with the pipe end, the sleeve 21 is then axially forced over the casing to lock the casing securely to the pipe through the threads 11.

The thread protector is shown placed and locked on a pipe 33 having threads 35 and a terminus 37 in FIG. 4. When so locked, the arcuate sections, while spaced slightly at the point of interconnection by webs 9, are substantially contiguous along the length thereof so as to form a cylindrical casing. The flange 5 of the arcuate sections 3 are in contact with the terminus 37 of the pipe while threads 11 around the inside surface of the arcuate sections are meshed with threads 35 of the pipe 33. As illustrated, the shoulders 19 around the outer surface of arcuate sections 3 adjacent the end 7 thereof are frictionally secured within the channel 31 of the sleeve 21. With the shoulders so secured and the flange 5 resting upon terminus 37 of the pipe, the lip 23 of the sleeve is in engagement with the flanges 5 of the arcuate sections. The securement is such that the sleeve 21 may rotate about its axis relative to the inner casing 1 and pipe 23 such that forces tending to turn the sleeve will not loosen the casing from the pipe. Any movement of the sleeve in the axial direction is prevented, however, by the securement of the shoulder 19 in channel 31 of the sleeve and the positioning of the flat ridge 25 of the lip 23 upon flanges 5 of the casing.

Once the thread protector is secured to the threads of a pipe, the removal thereof must be effected by unscrewing the protector as a unit from the pipe threads. As shown in FIG. 5, such removal is effected by insertion of a wrench or the like between opposed pairs or adjacent raised bosses 15 of the casing, which bosses are normally protected from impact by the lip 23 of the sleeve 21. While various types of wrenches or loosening means may be used, one is described in FIG. 5 as a rod 41 which has a depending strip 43 and a raised grip 45. By placement of the rod between opposed pairs of adjacent bosses 15, the depending strip 43 will, with a length slightly less than the inner diameter of the lip 23, be inserted between the bosses and, upon manipulation of the rod such as by grip 45, the casing 1 and sleeve 21 as a unit are removed from the pipe by a rotation of the rod and casing to unthread the casing from the threads of the pipe.

It is also a feature of the present thread protector that the casing and sleeve may be removed as a unit to examine the condition of the threads of the pipe and the unit then screwed back onto the threaded pipe for further protection, a factor that is important in the field for examination purposes. Because no portion of the outer sleeve is in contact with the pipe, it is thus the threaded casing which enables such removal and replacement of the thread protector as a unit.

The thread protector of the present invention is manufactured from thermoplastic material such as polyethylene, polypropylene, polyvinyl chloride, polycarbonate and the like or copolymers of the same. Polyethylene, because of its excellent impact and temperature resistant characteristics, is a preferred material.

There has been described a novel thread protector composed of an inner casing and an outer sleeve. The inner casing is easily placed upon the threaded end of a pipe because of its construction from arcuate sections that may be spread apart at the end of insertion and requires no precise alignment of the end of the pipe to the casing. The sleeve is then axially forced over the casing and the combined unit is securely fastened to the pipe with unscrewing of the same as a unit necessary for removal of the unit from the pipe. Such secure locking prevents premature removal of the protector by impact or other forces and provides complete protection for the pipe thread from the time of assembly of the protector upon the pipe to the time of removal therefrom by the user.

I claim:

1. A thread protector for protecting the externally threaded ends of a pipe, comprising:
    a. at least two spaced confronting arcuate sections each section having a top edge and a bottom edge, the top edge of each arcuate section formed as a radially inwardly directed annular flange with a plurality of radially inwardly directed, upwardly projecting bosses formed on each flange, each arcuate section having threads on the inner surface thereof adapted to engage said external threads of said pipe and a continuous raised peripheral shoulder on the outer surface thereof proximate the bottom edge with adjacent arcuate sections being interconnected at a point proximate their respective top edges to form a substantially contiguous cylindrical casing having a top end and a bottom end corresponding to the respective top edges and bottom edges of said arcuate sections; and
    b. a unitary cylindrical sleeve having a top end and a bottom end corresponding with the top end and bottom end of said casing, the top end of said sleeve formed as a radially inwardly and downwardly depending annular lip and a continuous peripheral channel formed in the inner surface of the sleeve proximate the bottom end thereof adapted to engage the continuous raised peripheral shoulder on the casing whereby when the casing is placed on the threaded end of the pipe and coaxial therewith and the sleeve is force fitted over the casing and coaxial therewith the threads of the casing engage the threads of the pipe, the annular flange contacts and overlays the end of the pipe, the shoulder engages within the channel of the sleeve and the lip of the sleeve contacts and overlays the flange of the casing to secure the thread protector in place over the threaded end of the pipe and to preclude removal thereof except by unscrewing the same as a unit from the threaded end of the pipe, the securement being such that the sleeve may rotate about its longitudinal axis relative to the casing and pipe such that forces tending to rotate the sleeve will not disengage the casing from the pipe.

2. The thread protector defined in claim 1 wherein each arcuate section comprising the cylindrically shaped casing is flared radially outwardly from the top edge to the bottom edge.

3. The thread protector defined in claim 1 wherein said adjacent arcuate sections are interconnected at the flanges thereof.

4. The thread protector defined in claim 1 wherein two said spaced, confronting arcuate sections are provided.

5. The thread protector defined in claim 1 wherein said threads on said inner surface of each arcuate section extend only a portion of the distance from said flange towards the bottom edge.

6. The thread protector defined in claim 1 wherein said bosses are spaced equidistantly about the periphery of the flange.

7. The thread protector defined in claim 1 wherein upon placement of said casing upon said pipe and placement of the sleeve thereover in locking position, said lip extends beyond said bosses in an longitudinal axial direction away from said pipe to protect the bosses from impacts.

8. The thread protector defined in claim 1 wherein each arcuate section comprising said casing and said cylindrically shaped sleeve are all formed of thermoplastic material.

9. The thread protector defined in claim 8 wherein said thermoplastic material is polyethylene.

* * * * *